United States Patent
Ikabata et al.

(10) Patent No.: US 6,537,365 B2
(45) Date of Patent: Mar. 25, 2003

(54) CEMENT CLINKER, CEMENT COMPOSITION, METHOD FOR PRODUCING CEMENT CLINKER, AND METHOD FOR TREATMENT OF WASTE CONTAINING ALKALI COMPONENT

(75) Inventors: Tatsuo Ikabata, Osaka (JP); Tatsushi Akiyama, Osaka (JP); Kazuhiro Kano, Osaka (JP)

(73) Assignee: Sumitomo Osaka Cement Co., Ltd., Tokyo (JP)

(*) Notice: Subject to any disclaimer, the term of this patent is extended or adjusted under 35 U.S.C. 154(b) by 0 days.

(21) Appl. No.: 09/958,417
(22) PCT Filed: Feb. 7, 2001
(86) PCT No.: PCT/JP01/00850
  § 371 (c)(1),
  (2), (4) Date: Oct. 8, 2001
(87) PCT Pub. No.: WO01/58821
  PCT Pub. Date: Aug. 16, 2001

(65) Prior Publication Data
  US 2003/0010257 A1 Jan. 16, 2003

(30) Foreign Application Priority Data
  Oct. 17, 1920 (JP) ............ 2000-316263
  Feb. 8, 2000 (JP) ............ 2000-030103

(51) Int. Cl.$^7$ ............... C04B 7/32
(52) U.S. Cl. ............. 106/692; 106/693; 106/694; 106/695; 106/722
(58) Field of Search ............. 106/692, 693, 106/694, 695, 722

(56) References Cited

U.S. PATENT DOCUMENTS 4,957,556 A * 9/1990 Kunbargi ............ 106/693
6,113,684 A * 9/2000 Kunbargi ............ 106/693

FOREIGN PATENT DOCUMENTS

| JP | 02080355 | 3/1990 |
| JP | 10330135 | 12/1998 |
| JP | 11278879 | 10/1999 |

* cited by examiner

Primary Examiner—Paul Marcantoni
(74) Attorney, Agent, or Firm—Wood, Phillips, Katz, Clark & Mortimer

(57) ABSTRACT

Cement clinker, characterized in that it comprises $Al_2O_3$ and $Fe_2O_3$ wherein the mass ratio of $Al_2O_3/Fe_2O_3$ is 0.05–0.62, and alkali components and $C_2S$ wherein the content Y (mass %) of alkali components and the content X (mass %) of $C_2S$ satisfy the formula: $0.0025X+0.1 \leq Y \leq 0.01X+0.8$. The production of the clinker allows the incorporation of alkali components into cement with an advantageous effect of enhancement of the hydration of belite and also with suppression of the lowering of flowability, which leads to the reuse of wastes containing alkali components as a cement raw material.

8 Claims, 8 Drawing Sheets

CEMENT CLINKER, CEMENT COMPOSITION, METHOD FOR PRODUCING CEMENT CLINKER, AND METHOD FOR TREATMENT OF WASTE CONTAINING ALKALI COMPONENT

FIELD OF THE INVENTION

This invention relates mainly to cement clinker and method for manufacturing the same, or cement composition containing the cement clinker, as well as method for treatment of waste containing alkali components for use as a cement raw material.

BACKGROUND OF THE INVENTION

In these years, recycling of wastes has arisen as a critical issue in view of global environment protection regardless of whether it belongs to government or industrial circle. Along with this situation, the cement industry has been positively promoting the recycling of wastes through the use of fly ash or blast-furnace slag as blended cement, or of various wastes as cement raw materials, and is expected to play an important role in the waste recycling.

Recently, there have been carried out various studies such as on "Eco-Cement" to use chlorine-containing waste such as municipal solid waste as a raw material for special cement, and "Completely-Recycled-Cement" to make up the recycling system which enables the manufacturing of cement by using only the recyclable materials as cement raw materials and the reuse of the same as cement raw materials after served.

However, the statistical fact is that 25 million tons of concrete waste is generated per year, of which 10 million tons are used as roadbed materials, while 15 million tons are thrown out. As a part of "Development of Techniques to Suppress Generation of Construction Byproducts and Recycle the Same" (1993–1994), a total technical development project of Japanese Ministry of Construction, a joint study on "Development of Utilization Technique of Recycled Concrete" was carried out, through which steady movement towards the recycling proceeds. However, there still remain numbers of problems on recycling of concrete waste as a recycled aggregate.

One of the problems arises in reusing fine particles worn out and removed from the surface of an aggregate during the recycling process for manufacturing a recycled aggregate of good quality. Considering the possibility to reuse fine particles as a cement raw material in the recycling method, it is appeared that the reusing of the fine particles as cement raw material is hardly achieved since alkali components contained in the fine particles deteriorate the flow ability of cement in association with the fact that the content of alkali components is 0.75% or less, a value prescribed by JIS.

Glass waste, sludge cake of bentonite used in building operations, or the like also poses a problem due to an excessive amount of alkali components contained therein when used as a cement raw material. Specifically, while an established system for reuse of glass waste by crushing it into cutlet exists, the reuse of colored glass is limited. Accordingly, there is a demand to the reuse of colored glass as cement raw material. However, these wastes also contain a large quantity of alkali components likewise the treatment of fine particles generated during manufacturing recycled aggregate, so that the a possibility to reuse these wastes as cement raw materials is greatly lowered.

SUMMARY OF THE INVENTION

It is an object of the present invention to suppress deterioration of the flowability, as well as simultaneously enhancing the hydration of belite or the like mainly comprised of $C_2S$, when alkali components have been incorporated into cement, thereby attempting effective use of waste containing alkali components as a cement raw material.

Considering the utilization of an alkali component-containing waste as a cement raw material, there remains a possibility to reuse the same, as far as the conditions that (i) a reactive aggregate is not used when cement is used as mortar, concrete or the like, and (ii) the prescribed value of the content of alkali components in cement is relaxed are met. Particularly, the incorporation of the alkali component-containing waste into a cement raw material with a large quantity of belite formed therein increases the solid-solution amount of alkali components in belite during the firing operation, thereby improving an inherently low hydration reactivity of belite. This improvement of the hydration reactivity leads to enhancement of a middle- and long-term strength development of cement, and hence is considered as a reasonable solution.

However, where the content of alkali components in a normal belite cement is increased, although there is produced a positive effect that the hydration is enhanced by the solid solution of alkali in belite, the alkali solid solution simultaneously occurs in a calcium aluminate phase whose hydration reactivity is inherently high. Accordingly, the hydration reactivity in the calcium aluminate phase is increased. This poses a new problem of lowering the flowability of cement paste, mortar, concrete or the like in actual use.

The present inventors have repeatedly studied in earnest to solve the above problem, and found that through the adjustment of the mass ratio of $Al_2O_3/Fe_2O_3$ in cement clinker, the ratio of the content of alkali components to the content of belite, and the ratio of $Na_2O$ to $K_2O$ in alkali within predetermined ranges suppresses the lowering of the flowability while enhancing the hydration reactivity of belite. Thus, the present invention has been achieved.

According to the present invention, there is provided cement clinker which is characterized in that it comprises $Al_2O_3$ and $Fe_2O_3$ wherein the mass ratio of $Al_2O_3/Fe_2O_3$ is 0.05–0.62, and alkali components and $C_2S$ wherein the content Y (mass %) of alkali components and the content X (mass %) of $C_2S$ satisfy the formula: $0.0025X+0.1 \leq Y \leq 0.01X+0.8$.

The content Y of alkali components and the content X of $C_2S$ are respectively represented in mass % of the content of alkali components and $C_2S$ to the total mass of the cement clinker.

According to another aspect of the present invention, there is provided cement clinker which is characterized in that it comprises $Al_2O_3$ and $Fe_2O_3$ wherein the mass ratio of $Al_2O_3/Fe_2O_3$ is 0.05–0.62, and alkali components and $C_2S$ wherein the content Y (mass %) of alkali components and the content X (mass %) of $C_2S$ satisfy the formulae:

$$0.0025X+0.25 \leq Y \leq 0.01X+0.8 \text{ when } 0.05 \leq Al_2O_3/Fe_2O_3 \leq 0.3, \quad (1)$$

and $$0.0025X+0.25 \leq Y \leq 0.01X+0.65 \text{ when } 0.3 \leq Al_2O_3/Fe_2O_3 \leq 0.5. \quad (2)$$

Also, in the cement clinker of the present invention, the mass ratio of $Na_2O$ to $K_2O$ of the alkali components preferably satisfies the formula: $0 \leq Na_2O/K_2O \leq 0.45$ According to another aspect of the present invention, there is provided a cement composition which is characterized in that the aforesaid cement clinker is mixed thereinto.

According to still another aspect of the present invention, there is provided a method for manufacturing cement clinker that comprises incorporating $Al_2O_3$ and $Fe_2O_3$ at the mass ratio of $Al_2O_3$ to $Fe_2O_3$ being 0.05–0.62, incorporating alkali components and $C_2S$ with the content Y (mass %) of alkali components and the content X (mass %) of $C_2S$ satisfying the formula: $0.0025X+0.1 \leq Y \leq 0.01X+0.8$, and firing the resultant.

According to another aspect of the present invention, there is provided a method of treating waste containing an alkali components, which is characterized in that it comprises incorporating $Al_2O_3$ and $Fe_2O_3$ at the mass ratio of $Al_2O_3$ to $Fe_2O_3$ being 0.05–0.62, incorporating alkali components and $C_2S$ with the content Y (mass %) of alkali components and the content X (mass %) of $C_2S$ satisfying the formula: $0.0025X+0.1 \leq Y \leq 0.01X+0.8$, and firing the resultant.

In the method of the present invention, the mass ratio of $Na_2O$ to $K_2O$ in the alkali components preferably satisfies the formula: $0 \leq Na_2O/K_2O \leq 0.4$.

It is possible to manufacture the cement clinker containing alkali components by incorporating alkali components into a cement raw material and firing the resultant. It is presumable that the alkali components in the cement clinker exist mainly in a solid solution form within a so-called cement clinker mineral such as $C_3S$, $C_2S$, $C_3A$, and $C_4AF$. Therefore, once the alkali components are solid-dissolved in the cement clinker mineral, a cement composition has an unstabilized structure which leads to a high hydration reactivity.

That is, by the incorporation of alkali components in the cement clinker with $Al_2O_3$ and $Fe_2O_3$ contained at a mass ratio of $Al_2O_3/Fe_2O_3$ of 0.05–0.62 to have the content Y (mass %) of the alkali components and the content X (mass %) of $C_2S$ satisfying the formula: $0.0025X+0.1 \leq Y \leq 0.01X+0.8$, it is possible to enhance through the above action an inherently low hydration reactivity of $C_2S$.

However, the incorporation of an excessive amount of the alkali components causes the alkali components to be solid-dissolved in a calcium aluminate phase whose hydration activity is inherently high. This further enhances the hydration reactivity, so that the flowability in the initial stage of the kneading operation of cement is lowered.

Accordingly, the generation of a calcium aluminate phase can be suppressed by having $Al_2O_3$ and $Fe_2O_3$ in cement clinker at a mass ratio of $Al_2O_3/Fe_2O_3$ of 0.05–0.62, while a belite phase can be activated through the solid-dissolution of alkali components effected by the incorporation of the alkali components to have the content Y (mass %) of the alkali components and the content X (mass %) of $C_2S$ satisfying the formula: $Y \leq 0.01X+0.8$. Further, it is possible to suppress the lowering of the flowability in the initial stage of the kneading operation of cement due to the increased hydration reactivity of a ferrite phase by suppressing excessive solid-dissolution of the alkali components in the ferrite phase.

It is more preferable to have $Al_2O_3$ and $Fe_2O_3$ in the cement clinker at a mass ratio of $Al_2O_3/Fe_2O_3$ of 0.05–0.5 with the content Y (mass %) of the alkali components and the content X (mass %) of $C_2S$ satisfying the formulae:

$0.0025X+0.25 \leq Y \leq 0.01X+0.8$ when $0.05 \leq Al_2O_3/Fe_2O_3 \leq 0.3$,  (1)

and $0.0025X+0.25 \leq Y \leq 0.01X+0.65$ when $0.3 \leq Al_2O_3/Fe_2O_3 \leq 0.5$,  (2)

thereby more effectively suppressing the lowering of the flowability in the initial stage, while further promoting the hydration reaction of $C_2S$.

Herein, alkali metal elements such as Na or K can be cited as alkali components contained in waste. These are generally contained as an alkali metal oxide such as $Na_2O$ or $K_2O$. The form of the alkali components existing in the cement clinker is not necessarily limited to the solid solution form in the cement clinker.

As examples of the waste containing the alkali components, it can be cited without limitation soil deposited on the bed of a dam, river or lake, a refining slag and various fused slag in addition to the aforementioned concrete waste, glass waste and sludge cake.

It is also possible to use any material other than wastes, as far as it contains alkali components.

The present inventors have also repeatedly studied to clear the difference of the actions of the respective types of the alkali components, and consequently found that when comparing $Na_2O$ with $K_2O$, the dissolved amount of $Na_2O$ in the ferrite phase is larger than that of $K_2O$, while $K_2O$ easily generates sulfates and the dissolved amount thereof in the ferrite phase is smaller. That is, it has been found that $Na_2O$ is a component which has a large influence to the lowering of the flowability of cement.

Accordingly, it is possible to enhance the flowability of cement through the suppressed dissolution of the alkali components in the ferrite phase, as well as enhancing the hydration reactivity of a belite phase through the promoted solid-dissolution of the alkali components in the belite phase by adjusting the mass ratio of $Na_2O$ to $K_2O$ in the cement clinker to satisfy the formula: $0 \leq Na_2O/K_2O \leq 0.45$.

The alkali components are fired along with a cement raw material, and is contained in a solid solution form in a cement clinker mineral or in the form of an alkali metal sulfate such as $Na_2SO_4$ and $K_2SO_4$ or an alkali metal chloride such as NaCl and KCl.

As an example of the method for adjustment of the content of alkali components in the cement clinker, it can be cited a method including previously measuring the content of alkali components in an alkali-containing raw material (waste or the like), and incorporating the alkali-containing raw material into a cement raw material while simultaneously adjusting the content of alkali components in the alkali-containing raw material.

BEST MODE FOR CARRYING OUT THE INVENTION

Now, the description will be made for the working examples of the present invention.

A raw material for cement clinker is adjusted to have the compositional ratio as shown in Table 1. The raw material was fired at 1450° C. for one hour within an electric furnace, then placed out of the electric furnace and then rapidly quenched in the air. The cement clinker with a target composition was thus prepared. The content of alkali components in the cement clinker was varied by varying the content of alkali components to be incorporated into the prepared raw material. Gypsum was incorporated in each of cement clinkers of these examples and comparative examples to have 2 mass % in $SO_3$ content and each resultant was mixed and crushed by a test mill. Cement of each of the examples and comparative examples was thus prepared. Tables 2–4 show IM(mass ratio of $Al_2O_3/Fe_2O_3$) and $C_2S$ content of cement in each of Examples 1–48 and Comparative Examples 1–36, and the content of alkali components ($Na_2Oeq$) in each cement clinker after subjected to the firing.

Herein, the alkali ($Na_2Oeq$) content was calculated by using the formula: $Na_2Oeq=Na_2O+0.658K_2O$ based upon the contents of $Na_2O$ and $K_2O$ in the cement clinker. The fineness of each cement was 3200–3400 $cm^2/g$ in specific surface area by blaine.

TABLE 1

| Comp. Examples | Examples | SiO$_2$ | Al$_2$O$_3$ | Fe$_2$O$_3$ | CaO | MgO | Total | IM | C$_3$S | C$_2$S | C$_3$A | C$_4$AF | C$_2$F |
|---|---|---|---|---|---|---|---|---|---|---|---|---|---|
|  | 9, 10 | 28.2 | 3.5 | 3.9 | 63.3 | 1.1 | 100 | 0.90 | 14 | 70 | 2.7 | 11.9 |  |
|  | 21, 22 | 25.9 | 3.6 | 4.0 | 65.1 | 1.4 | 100 | 0.90 | 38 | 45 | 2.8 | 12.2 |  |
|  | 33, 34 | 23.9 | 3.8 | 4.2 | 66.5 | 1.6 | 100 | 0.90 | 58 | 25 | 3.0 | 12.8 |  |
| 1–3 | 1, 2 | 28.0 | 3.0 | 5.2 | 62.7 | 1.1 | 100 | 0.58 | 14 | 70 |  | 14.3 | 0.9 |
| 19–21 | 13, 14 | 25.4 | 3.3 | 5.7 | 64.2 | 1.4 | 100 | 0.58 | 37 | 45 |  | 15.7 | 0.9 |
| 35–37 | 25, 26 | 23.4 | 3.5 | 6.0 | 65.5 | 1.6 | 100 | 0.58 | 56 | 25 |  | 16.7 | 0.9 |
| 4–9 | 3, 4 | 28.1 | 2.3 | 5.9 | 62.6 | 1.1 | 100 | 0.39 | 14 | 70 |  | 11.0 | 3.9 |
| 23–26 | 15, 16 | 25.5 | 2.5 | 6.4 | 64.2 | 1.4 | 100 | 0.39 | 38 | 44 |  | 11.9 | 4.2 |
| 38–41 | 27, 28 | 23.6 | 2.6 | 6.7 | 65.5 | 1.6 | 100 | 0.39 | 56 | 25 |  | 12.4 | 4.5 |
| 10–15 | 5, 6 | 28.2 | 1.5 | 6.7 | 62.5 | 1.1 | 100 | 0.22 | 14 | 70 |  | 7.1 | 7.4 |
| 27–31 | 17, 18 | 25.7 | 1.6 | 7.2 | 64.1 | 1.4 | 100 | 0.22 | 38 | 45 |  | 7.6 | 8.0 |
| 42–45 | 29, 30 | 23.7 | 1.7 | 7.6 | 65.4 | 1.6 | 100 | 0.22 | 57 | 25 |  | 8.1 | 8.4 |
| 16–18 | 7, 8 | 28.1 | 0.8 | 7.7 | 62.3 | 1.1 | 100 | 0.10 | 14 | 70 |  | 3.8 | 11.0 |
| 32–34 | 19, 20 | 25.7 | 0.8 | 8.1 | 64.0 | 1.4 | 100 | 0.10 | 38 | 45 |  | 3.8 | 11.7 |
| 46–48 | 31, 32 | 23.6 | 0.9 | 8.7 | 65.2 | 1.6 | 100 | 0.10 | 57 | 25 |  | 4.3 | 12.4 |
|  | 11, 12 | 28.2 | 0.2 | 8.3 | 62.2 | 1.1 | 100 | 0.02 | 14 | 70 |  | 1.0 | 13.6 |
|  | 23, 24 | 25.7 | 0.2 | 8.9 | 63.8 | 1.4 | 100 | 0.02 | 38 | 45 |  | 1.0 | 14.6 |
|  | 35, 36 | 23.7 | 0.2 | 9.4 | 65.1 | 1.6 | 100 | 0.02 | 57 | 25 |  | 1.0 | 15.5 |

TABLE 2

| | Clinker Composition | | | Compressive Strength (N/mm$^2$) | | Strength Enhancement | Pad Area | |
|---|---|---|---|---|---|---|---|---|
| | IM | C$_2$S | Na$_2$Oeq | 2W | 8W | Coefficient | (cm$^2$) | Judgement |
| Example 1 | 0.58 | 70 | 0.37 | 15.6 | 51.8 | 52 | 67 | ○ |
| Example 2 | 0.58 | 70 | 0.88 | 16.0 | 57.6 | 59 | 62 | ○ |
| Example 3 | 0.58 | 70 | 1.35 | 16.3 | 58.2 | 60 | 56 | ○ |
| Example 4 | 0.39 | 70 | 0.35 | 14.7 | 51.0 | 52 | 81 | ○ |
| Example 5 | 0.39 | 70 | 0.51 | 15.2 | 54.7 | 56 | 79 | ◎ |
| Example 6 | 0.39 | 70 | 0.73 | 15.5 | 56.8 | 59 | 77 | ◎ |
| Example 7 | 0.39 | 70 | 0.99 | 15.8 | 59.2 | 62 | 74 | ◎ |
| Example 8 | 0.39 | 70 | 1.18 | 16.1 | 60.6 | 64 | 68 | ◎ |
| Example 9 | 0.39 | 70 | 1.4 | 16.6 | 59.3 | 61 | 60 | ○ |
| Example 10 | 0.22 | 70 | 0.34 | 14.4 | 51.6 | 53 | 90 | ○ |
| Example 11 | 0.22 | 70 | 0.49 | 14.8 | 56.2 | 59 | 88 | ◎ |
| Example 12 | 0.22 | 70 | 0.68 | 15.1 | 58.5 | 62 | 85 | ◎ |
| Example 13 | 0.22 | 70 | 0.95 | 15.6 | 60.3 | 64 | 82 | ◎ |
| Example 14 | 0.22 | 70 | 1.21 | 15.9 | 59.7 | 63 | 74 | ◎ |
| Example 15 | 0.22 | 70 | 1.43 | 16.3 | 59.5 | 62 | 65 | ◎ |
| Example 16 | 0.1 | 70 | 0.38 | 14.1 | 50.3 | 52 | 91 | ○ |
| Example 17 | 0.1 | 70 | 0.9 | 14.9 | 56.5 | 59 | 79 | ◎ |
| Example 18 | 0.1 | 70 | 1.38 | 15.4 | 56.1 | 58 | 66 | ◎ |
| Comp. Example 1 | 0.58 | 70 | 0.23 | 15.2 | 48.3 | 47 | 71 | Δ |
| Comp. Example 2 | 0.58 | 70 | 1.59 | 17.4 | 57.7 | 58 | 41 | Δ |
| Comp. Example 3 | 0.39 | 70 | 0.2 | 14.3 | 46.5 | 46 | 84 | Δ |
| Comp. Example 4 | 0.39 | 70 | 1.61 | 17.0 | 58.9 | 60 | 44 | Δ |
| Comp. Example 5 | 0.22 | 70 | 0.22 | 14.1 | 47.7 | 48 | 91 | Δ |
| Comp. Example 6 | 0.22 | 70 | 1.6 | 16.8 | 59.1 | 60 | 49 | Δ |
| Comp. Example 7 | 0.1 | 70 | 0.22 | 13.8 | 46.1 | 46 | 93 | Δ |
| Comp. Example 8 | 0.1 | 70 | 1.65 | 15.8 | 55.9 | 57 | 48 | Δ |
| Comp. Example 9 | 0.9 | 70 | 0.41 | 16.5 | 53.4 | 53 | 45 | Δ |
| Comp. Example 10 | 0.9 | 70 | 0.92 | 18.0 | 58.6 | 58 | 41 | Δ |
| Comp. Example 11 | 0.02 | 70 | 0.84 | 13.5 | 44.3 | 44 | 86 | Δ |
| Comp. Example 12 | 0.02 | 70 | 1.32 | 14.1 | 46.1 | 46 | 71 | Δ |

TABLE 3

| | Clinker Composition | | | Compressive Strength (N/mm²) | | Strength Enhancement | Pad Area | |
|---|---|---|---|---|---|---|---|---|
| | IM | $C_2S$ | $Na_2Oeq$ | 2W | 8W | Coefficient | (cm²) | Judgement |
| Example 19 | 0.58 | 45 | 0.28 | 35.0 | 58.3 | 52 | 70 | ○ |
| Example 20 | 0.58 | 45 | 0.71 | 35.6 | 63.1 | 61 | 60 | ○ |
| Example 21 | 0.58 | 45 | 1.18 | 36.1 | 62.9 | 60 | 55 | ○ |
| Example 22 | 0.39 | 44 | 0.3 | 34.1 | 57.3 | 53 | 79 | ○ |
| Example 23 | 0.39 | 44 | 0.49 | 34.4 | 59.9 | 58 | 77 | ◉ |
| Example 24 | 0.39 | 44 | 0.71 | 34.9 | 62.2 | 62 | 75 | ◉ |
| Example 25 | 0.39 | 44 | 0.95 | 35.3 | 62.6 | 62 | 68 | ◉ |
| Example 26 | 0.39 | 44 | 1.17 | 35.7 | 62.1 | 60 | 61 | ○ |
| Example 27 | 0.22 | 45 | 0.29 | 33.5 | 57.5 | 53 | 84 | ○ |
| Example 28 | 0.22 | 45 | 0.51 | 33.9 | 60.4 | 59 | 82 | ◉ |
| Example 29 | 0.22 | 45 | 0.73 | 34.2 | 62.5 | 63 | 79 | ◉ |
| Example 30 | 0.22 | 45 | 0.96 | 34.7 | 62.4 | 62 | 71 | ◉ |
| Example 31 | 0.22 | 45 | 1.15 | 35.0 | 62.0 | 60 | 65 | ◉ |
| Example 32 | 0.1 | 45 | 0.3 | 31.6 | 55.2 | 52 | 86 | ○ |
| Example 33 | 0.1 | 45 | 0.68 | 32.5 | 59.8 | 61 | 78 | ◉ |
| Example 34 | 0.1 | 45 | 1.14 | 33.2 | 59.4 | 58 | 67 | ◉ |
| Comp. Example 13 | 0.58 | 45 | 0.13 | 34.4 | 55.8 | 48 | 72 | Δ |
| Comp. Example 14 | 0.58 | 45 | 1.37 | 36.5 | 62.4 | 58 | 42 | Δ |
| Comp. Example 15 | 0.39 | 44 | 0.13 | 33.8 | 54.4 | 47 | 81 | Δ |
| Comp. Example 16 | 0.39 | 44 | 1.38 | 36.0 | 61.3 | 58 | 45 | Δ |
| Comp. Example 17 | 0.22 | 45 | 0.12 | 33.0 | 54.6 | 48 | 87 | Δ |
| Comp. Example 18 | 0.22 | 45 | 1.36 | 35.2 | 61.5 | 58 | 47 | Δ |
| Comp. Example 19 | 0.1 | 45 | 0.15 | 31.1 | 52.8 | 48 | 89 | Δ |
| Comp. Example 20 | 0.1 | 45 | 1.39 | 33.7 | 58.9 | 56 | 49 | Δ |
| Comp. Example 21 | 0.9 | 45 | 0.31 | 36.2 | 60.1 | 53 | 48 | Δ |
| Comp. Example 22 | 0.9 | 45 | 0.74 | 36.8 | 64.7 | 62 | 42 | Δ |
| Comp. Example 23 | 0.02 | 45 | 0.65 | 29.1 | 47.8 | 42 | 83 | Δ |
| Comp. Example 24 | 0.02 | 45 | 1.08 | 29.6 | 49.3 | 44 | 74 | Δ |

TABLE 4

| | Clinker Composition | | | Compressive Strength (N/mm²) | | Strength Enhancement | Pad Area | |
|---|---|---|---|---|---|---|---|---|
| | IM | $C_2S$ | $Na_2Oeq$ | 2W | 8W | Coefficient | (cm²) | Judgement |
| Example 35 | 0.58 | 25 | 0.22 | 50.8 | 63.7 | 52 | 66 | ○ |
| Example 36 | 0.58 | 25 | 0.6 | 51.3 | 65.8 | 58 | 61 | ○ |
| Example 37 | 0.58 | 25 | 0.97 | 51.9 | 66.1 | 57 | 55 | ○ |
| Example 38 | 0.39 | 25 | 0.21 | 49.1 | 62.6 | 54 | 78 | ○ |
| Example 39 | 0.39 | 25 | 0.39 | 49.5 | 64.5 | 60 | 76 | ◉ |
| Example 40 | 0.39 | 25 | 0.68 | 49.8 | 65.3 | 62 | 70 | ◉ |
| Example 41 | 0.39 | 25 | 0.93 | 50.4 | 65.7 | 61 | 62 | ○ |
| Example 42 | 0.22 | 25 | 0.19 | 47.2 | 60.8 | 54 | 83 | ○ |
| Example 43 | 0.22 | 25 | 0.41 | 48.7 | 63.9 | 61 | 80 | ◉ |
| Example 44 | 0.22 | 25 | 0.7 | 49.1 | 65.2 | 64 | 73 | ◉ |
| Example 45 | 0.22 | 25 | 0.96 | 49.6 | 65.0 | 62 | 65 | ◉ |
| Example 46 | 0.1 | 25 | 0.21 | 46.0 | 59.6 | 54 | 83 | ○ |
| Example 47 | 0.1 | 25 | 0.56 | 47.4 | 61.7 | 57 | 74 | ◉ |
| Example 48 | 0.1 | 25 | 0.93 | 48.2 | 62.4 | 57 | 66 | ◉ |
| Comp. Example 25 | 0.58 | 25 | 0.09 | 50.5 | 60.9 | 42 | 70 | Δ |
| Comp. Example 26 | 0.58 | 25 | 1.16 | 52.5 | 65.9 | 54 | 44 | Δ |

TABLE 4-continued

| | Clinker Composition | | | Compressive Strength (N/mm$^2$) | | Strength Enhancement | Pad Area | |
|---|---|---|---|---|---|---|---|---|
| | IM | C$_2$S | Na$_2$Oeq | 2W | 8W | Coefficient | (cm$^2$) | Judgement |
| Comp. Example 27 | 0.39 | 25 | 0.07 | 48.8 | 60.1 | 45 | 80 | Δ |
| Comp. Example 28 | 0.39 | 25 | 1.15 | 51.2 | 65.0 | 55 | 48 | Δ |
| Comp. Example 29 | 0.22 | 25 | 0.09 | 46.6 | 58.2 | 46 | 85 | Δ |
| Comp. Example 30 | 0.22 | 25 | 1.16 | 50.3 | 64.8 | 58 | 49 | Δ |
| Comp. Example 31 | 0.1 | 25 | 0.07 | 45.3 | 57.1 | 47 | 87 | Δ |
| Comp. Example 32 | 0.1 | 25 | 1.21 | 48.9 | 62.3 | 54 | 48 | Δ |
| Comp. Example 33 | 0.9 | 25 | 0.29 | 52.4 | 65.3 | 52 | 46 | Δ |
| Comp. Example 34 | 0.9 | 25 | 0.63 | 53.6 | 67.2 | 54 | 40 | Δ |
| Comp. Example 35 | 0.02 | 25 | 0.59 | 41.1 | 51.3 | 41 | 77 | Δ |
| Comp. Example 36 | 0.02 | 25 | 0.86 | 41.8 | 52.2 | 42 | 71 | Δ |

TABLE 5

| | Clinker Composition | | | | Compressive Strength (N/mm$^2$) | | Strength Enhancement | Pad Area | |
|---|---|---|---|---|---|---|---|---|---|
| | IM | C$_2$S | Na$_2$Oeq | Na$_2$O/K$_2$O | 2W | 8W | Coefficient | (cm$^2$) | Judgement |
| Example 49 | 0.39 | 70 | 1.39 | 3.31 | 17.3 | 61.3 | 63 | 58 | ○ |
| Example 50 | 0.39 | 70 | 1.40 | 1.02 | 16.9 | 60.8 | 63 | 59 | ○ |
| Example 9 | 0.39 | 70 | 1.40 | 0.55 | 16.6 | 59.3 | 61 | 60 | ○ |
| Example 51 | 0.39 | 70 | 1.39 | 0.38 | 16.4 | 59.2 | 61 | 66 | ⊙ |
| Example 52 | 0.39 | 70 | 1.38 | 0.22 | 16.2 | 58.5 | 60 | 73 | ⊙ |
| Example 53 | 0.39 | 70 | 1.39 | 0.12 | 16.3 | 58.1 | 60 | 75 | ⊙ |
| Example 54 | 0.39 | 44 | 1.17 | 3.00 | 35.2 | 62.4 | 62 | 58 | ○ |
| Example 55 | 0.39 | 44 | 1.18 | 1.06 | 35.4 | 62.3 | 61 | 60 | ○ |
| Example 26 | 0.39 | 44 | 1.17 | 0.53 | 35.7 | 62.1 | 60 | 61 | ○ |
| Example 56 | 0.39 | 44 | 1.17 | 0.37 | 35.8 | 61.9 | 59 | 68 | ⊙ |
| Example 57 | 0.39 | 44 | 1.16 | 0.23 | 36.0 | 62.1 | 59 | 73 | ⊙ |
| Example 58 | 0.39 | 44 | 1.17 | 0.13 | 36.3 | 62.4 | 59 | 75 | ⊙ |
| Example 59 | 0.39 | 25 | 0.93 | 3.08 | 50.0 | 64.8 | 59 | 59 | ○ |
| Example 60 | 0.39 | 25 | 0.91 | 1.06 | 50.3 | 65.3 | 60 | 60 | ○ |
| Example 41 | 0.39 | 25 | 0.93 | 0.59 | 50.4 | 65.7 | 61 | 62 | ○ |
| Example 61 | 0.39 | 25 | 0.92 | 0.37 | 50.8 | 66.1 | 61 | 67 | ⊙ |
| Example 62 | 0.39 | 25 | 0.91 | 0.20 | 51.2 | 66.3 | 60 | 64 | ⊙ |
| Example 63 | 0.39 | 25 | 0.93 | 0.13 | 51.7 | 66.5 | 59 | 76 | ⊙ |

The mineral composition of each cement clinker in Table 1 was calculated by using the following formulae:

When IM(mass ratio of Al$_2$O$_3$/Fe$_2$O$_3$)≦0.64, $C_3S=4.071 \times CaO(\%) - 7.6 \times SiO_2(\%) - 6.718 \times Al_2O_3(\%) - 1.43 \times Fe_2O_3(\%)$;

$C_2S=2.867 \times SiO_2(\%) - 0.7544 \times C_3S(\%)$;

$C_3A=2.65 \times Al_2O_3(\%) - 1.692 \times Fe_2O_3(\%)$;

and $C_4AF=3.043 \times Fe_2O_3(\%)$.

When IM≦0.64, $C_3S=4.071 \times CaO(\%) - 7.6 \times SiO_2(\%) - 4.479 \times Al_2O_3(\%) - 2.86 \times Fe_2O_3(\%)$;

$C_2S=2.867 \times SiO_2(\%) - 0.7544 \times C_3S(\%)$;

$C_4AF=4.766 \times Al_2O_3(\%)$;

and $C_2F=1.702 \times Fe_2O_3(\%) - 2.666 \times Al_2O_3(\%)$.

(Evaluation Method)

The evaluation was made by measuring "Pad Area" as an index of the flowability of cement and determining "Strength Enhancement Coefficient" as an index of the hydration reactivity of belite for each of the Examples and Comparative Examples.

Measuring Method of Pad Area 200 g of cement was invested in approximately 10 seconds into a 200 ml beaker with 70 ml of mulling water containing a water reducing agent, intensely stirred for 1 minute 50 seconds with a hand mixer to prepare a paste. This paste was poured by means of a spoon into a miniature slump cone placed on a plastic plate, and the paste in the miniature slump cone was well stirred by means of a micro-spatula and its surface was leveled. The miniature slump cone was then raised after 3 minutes elapsed from the start of investing cement. The short diameter and long diameter of the paste extending over the plastic plate was measured to calculate the pad area (cm$^2$).

Strength Enhancement Coefficient

The compression strength of cement mortar is measured in compliance with JIS R5201-1997, Physical Test Method for Cements. Since the hydration of belite becomes activated after its material has been aged for two weeks during the hydration process of cement, the compressive strength of mortar of materials aged 2 weeks and 8 weeks is measured, and the strength enhancement coefficient is calculated by using the formula (1).

Strength enhancement coefficient=100×(strength on the 8th week−strength on the 2nd weeks)/C$_2$S content   formula (1)

In compliance with the above evaluation method, the strength enhancement coefficient was determined by measuring the pad area and the compression strength of mortar. The judgement was made in such a manner that when cement has a pad area of 55 cm$^2$ or more and cement has a strength enhancement coefficient of 50 or more, each cement was judged as passing a corresponding standard, and only the cement passed both standards was judged as being good, a symbol for which is: "○".

When cement has a pad area of 65 cm$^2$ or more and a strength enhancement coefficient of 55 or more, it was given a symbol "◎".

The judged results are shown in TABLES 2–5 and FIGS. 1–8.

It is apparent from FIGS. 1–3 that when the mass ratio of Al$_2$O$_3$/Fe$_2$O$_3$ is in the range of 0.05–0.62, the flowability and the hydration reactivity with respect to a predetermined content of alkali components lie in a favorable range, regardless of whether the content of C$_2$S is small or large.

It is also apparent from FIGS. 4–7 that the content of alkali components is admissible when satisfying the formula: $0.0025X+0.1 \leq Y \leq 0.01X+0.8$ in the relationship between the content Y (mass %) of alkali components and the content X (mass %) of C$_2$S.

It is also apparent that the flowability and the hydration reactivity lie in a more favorable range when satisfying the formulae:

$0.0025X+0.25 \leq Y \leq 0.01X+0.8$ when $0.05 \leq Al_2O_3/Fe_2O_3 \leq 0.3$,   (1)

and $0.0025X+0.25 \leq Y \leq 0.01X+0.65$ when $0.3 \leq Al_2O_3/Fe_2O_3 \leq 0.5$.   (2)

It is also apparent that the flowability was improved, when Na$_2$O and K$_2$O of alkali components are adjusted to satisfy the formula: $0 \leq Na_2O/K_2O \leq 0.45$.

As described above, according to the present invention, the lowering of the flowability in the initial stage of the kneading operation can be suppressed, while a medium- and long-term strength development of cement through the enhanced hydration reactivity of belite (C$_2$S) can be enhanced.

It is also possible to improve the flowability while maintaining the compression strength by the adjustment of the proportion of alkali components.

Whereby, waste containing alkali components can be effectively recycled as a cement raw material.

Figure 1:
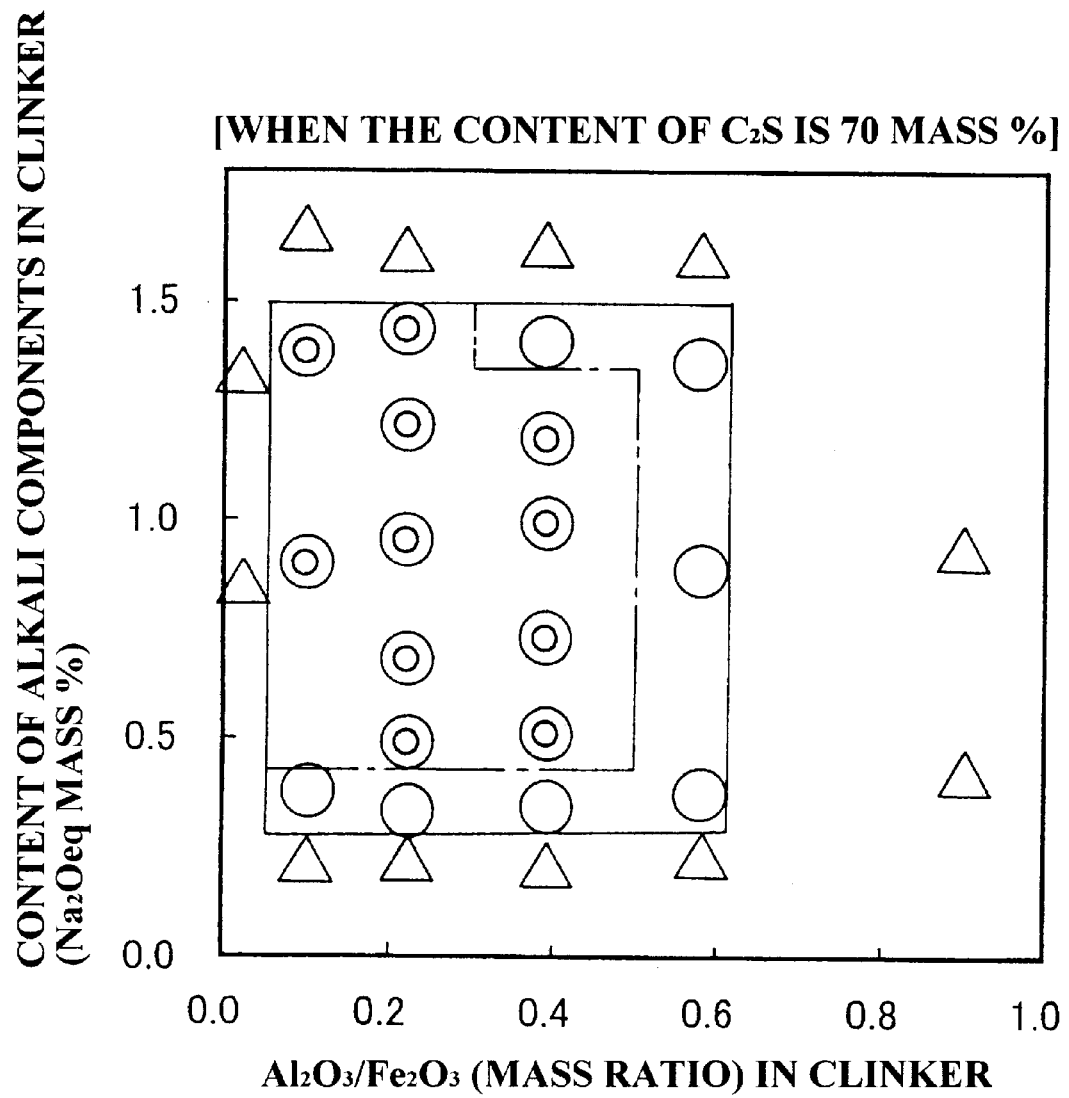
FIG. 1 is a graph showing the judged results by the coordinates of IM and the content of alkali components in the case that the content of C$_2$S is 70 mass %.
Figure 2:
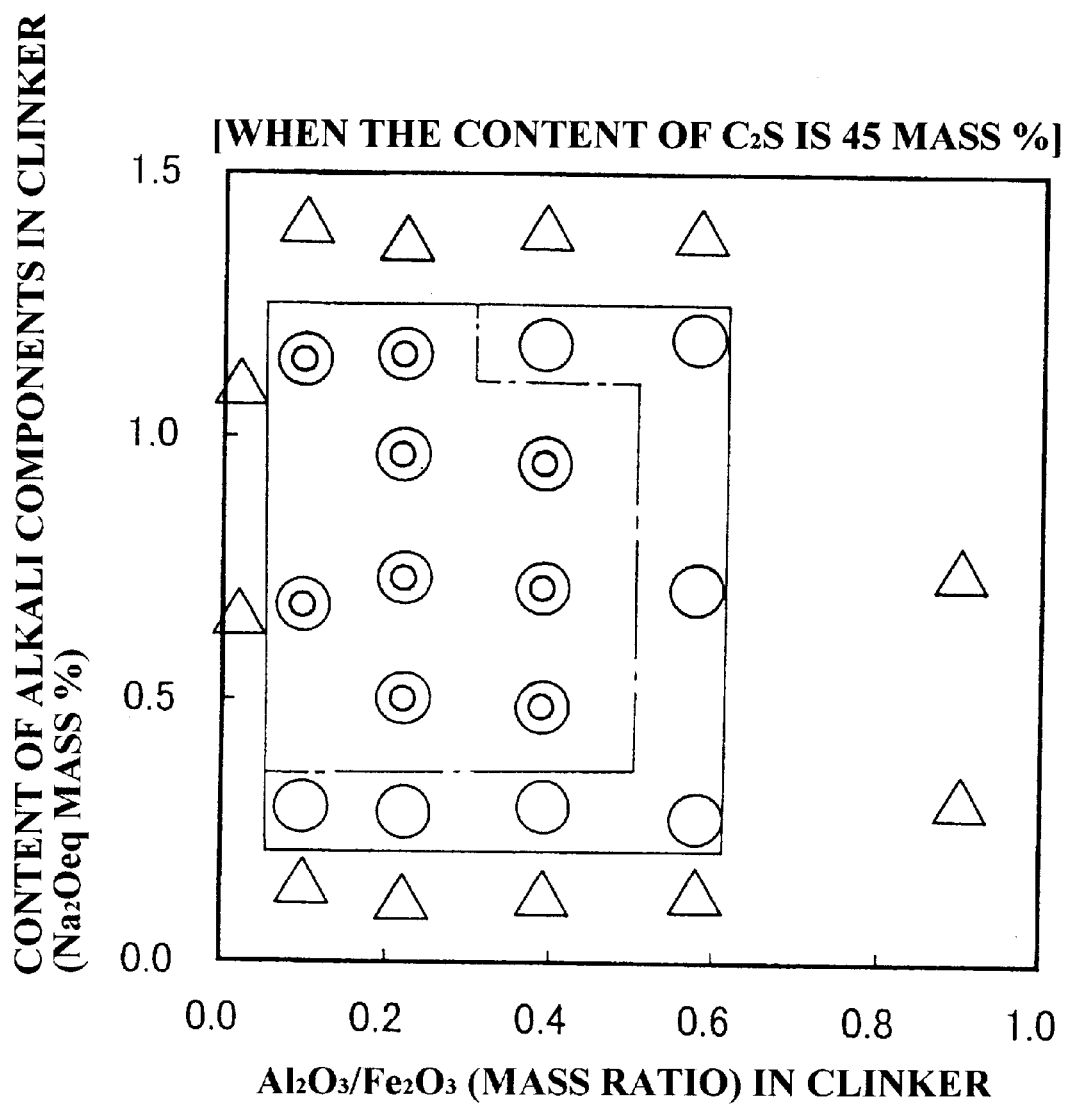
FIG. 2 is a graph showing the judged results by the coordinates of IM and the content of alkali components in the case that the content of C$_2$S is 45 mass %.
Figure 3:
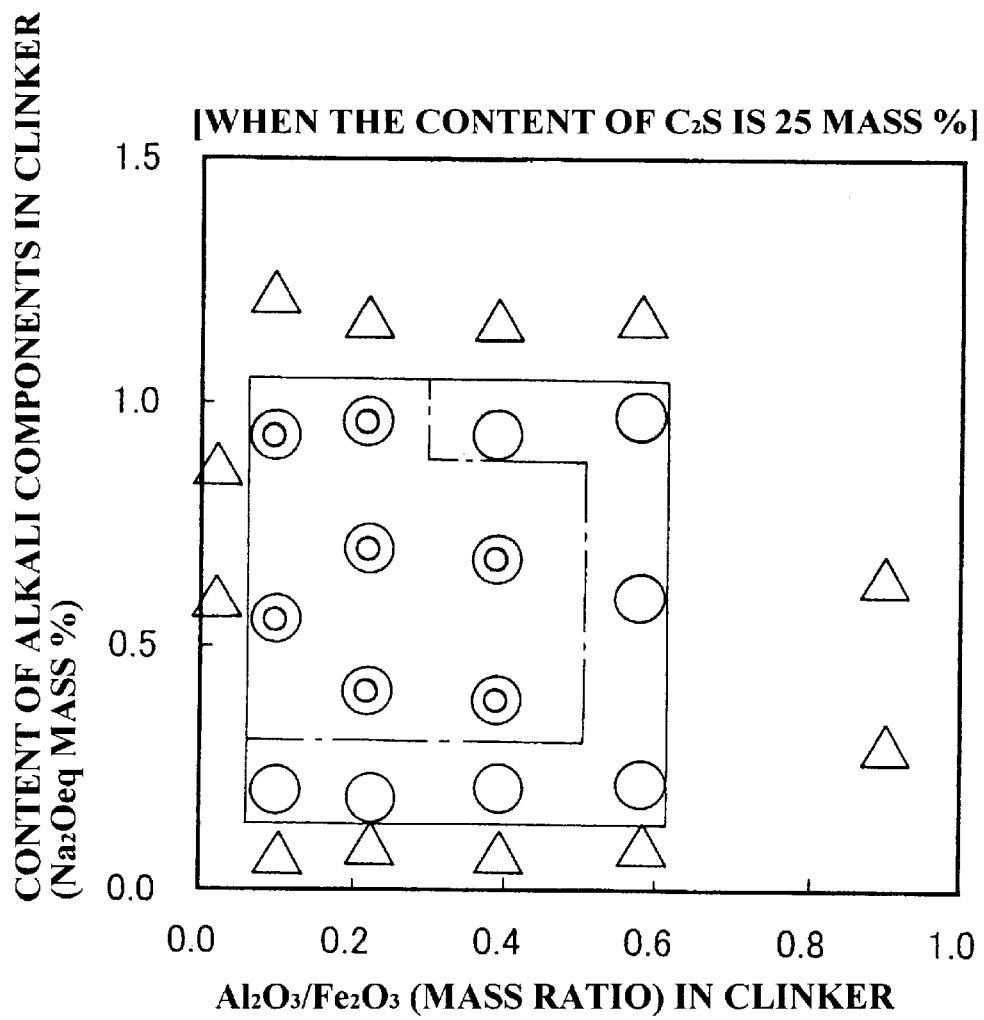
FIG. 3 is a graph showing the judged results by the coordinates of IM and the content of alkali components in the case that the content of C$_2$S is 25 mass %.
Figure 4:
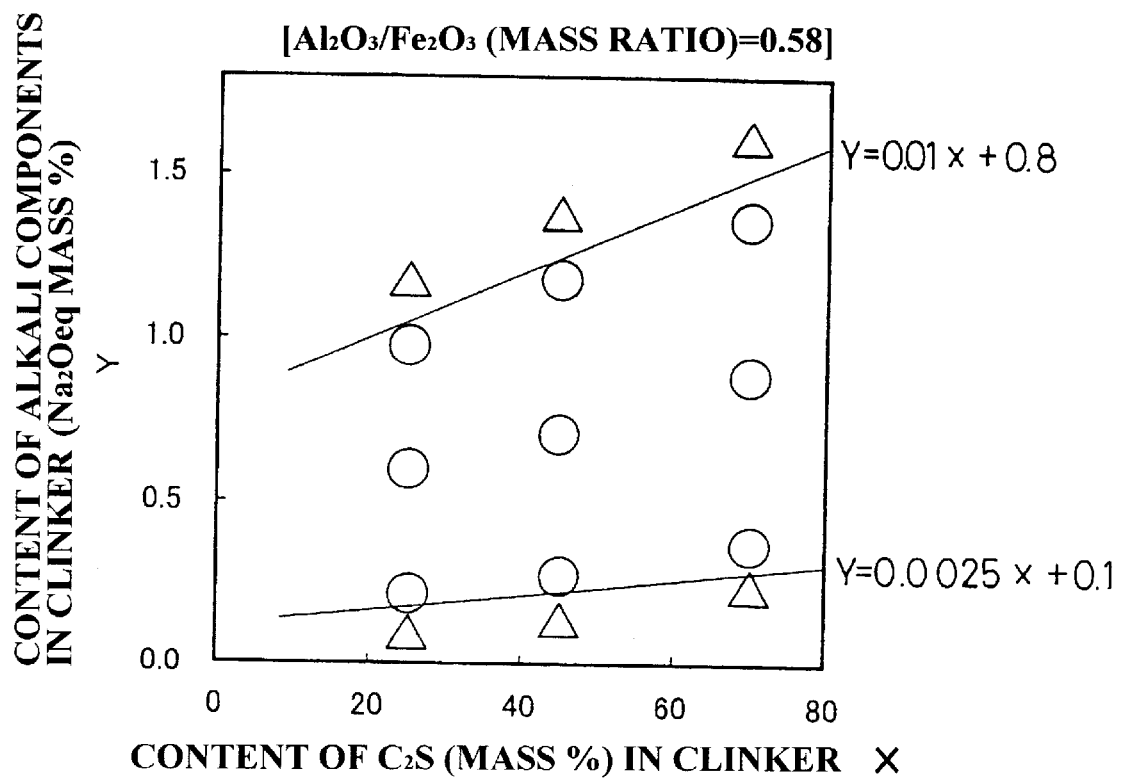
FIG. 4 is a graph showing the judged results by the coordinates of C$_2$S and the content of alkali components in the case that IM is 0.58.
Figure 5:
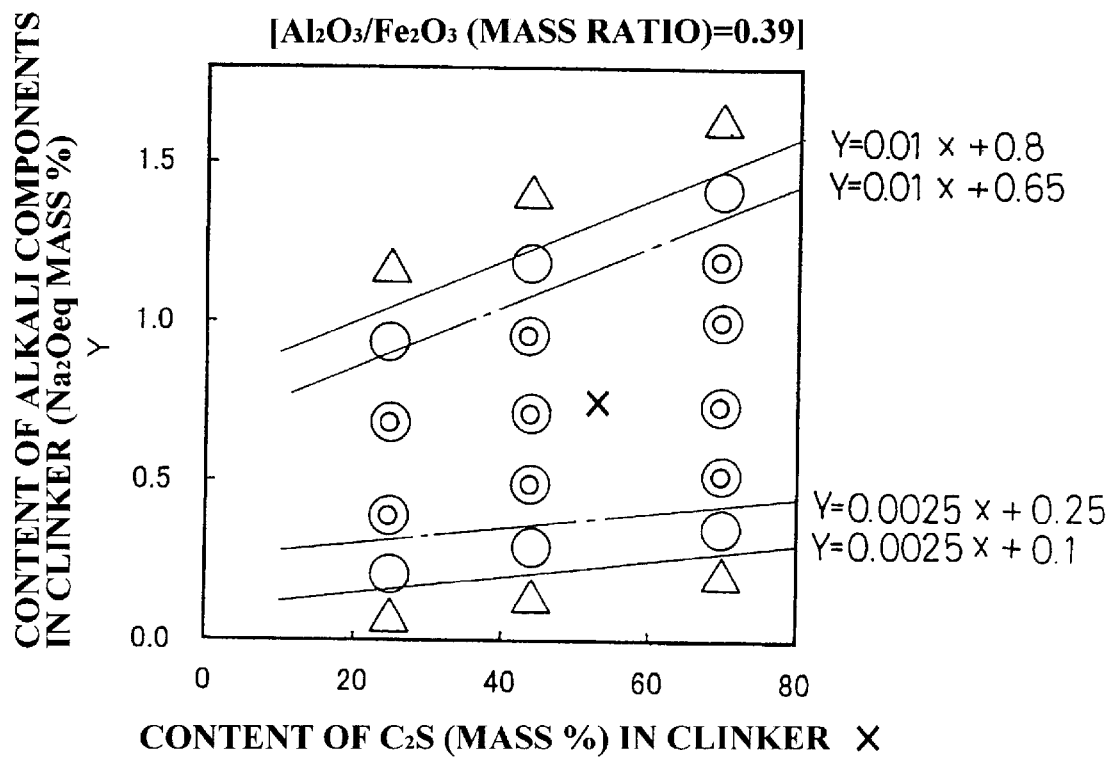
FIG. 5 is a graph showing the judged results by the coordinates of C$_2$S and the content of alkali components in the case that IM is 0.39.
Figure 6:
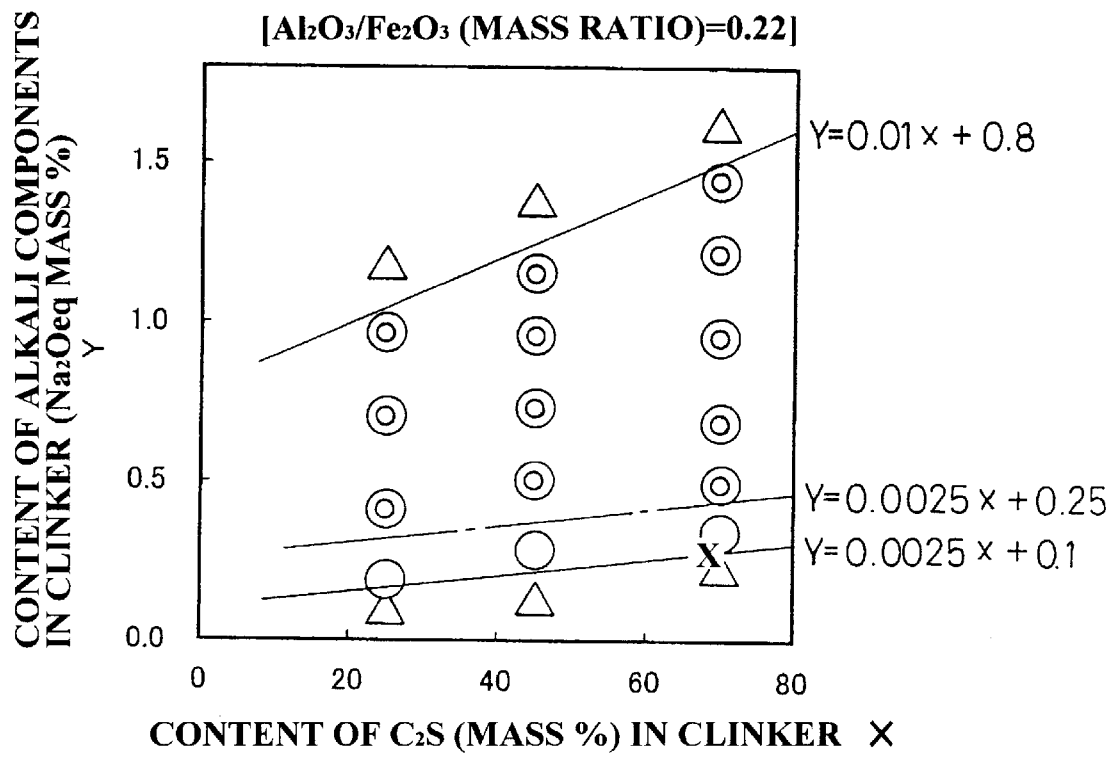
FIG. 6 is a graph showing the judged results by the coordinates of C$_2$S and the content of alkali components in the case that IM is 0.22.
Figure 7:
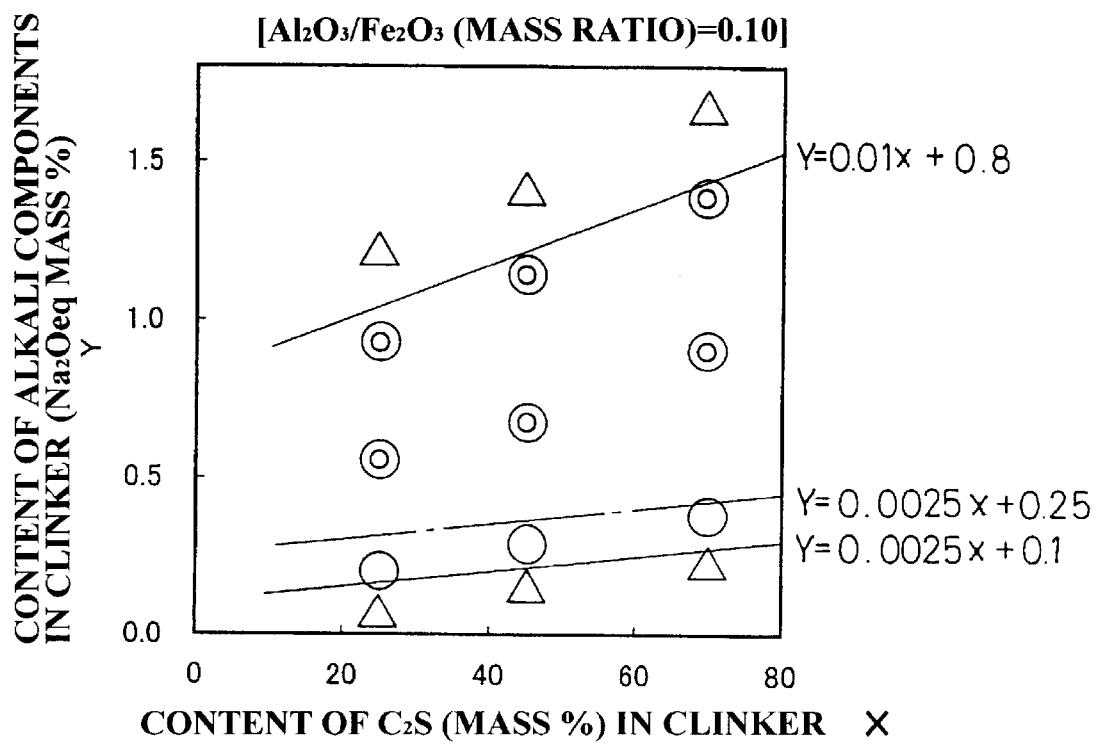
FIG. 7 is a graph showing the judged results by the coordinates of C$_2$S and the content of alkali components in the case that IM is 0.10.
Figure 8:
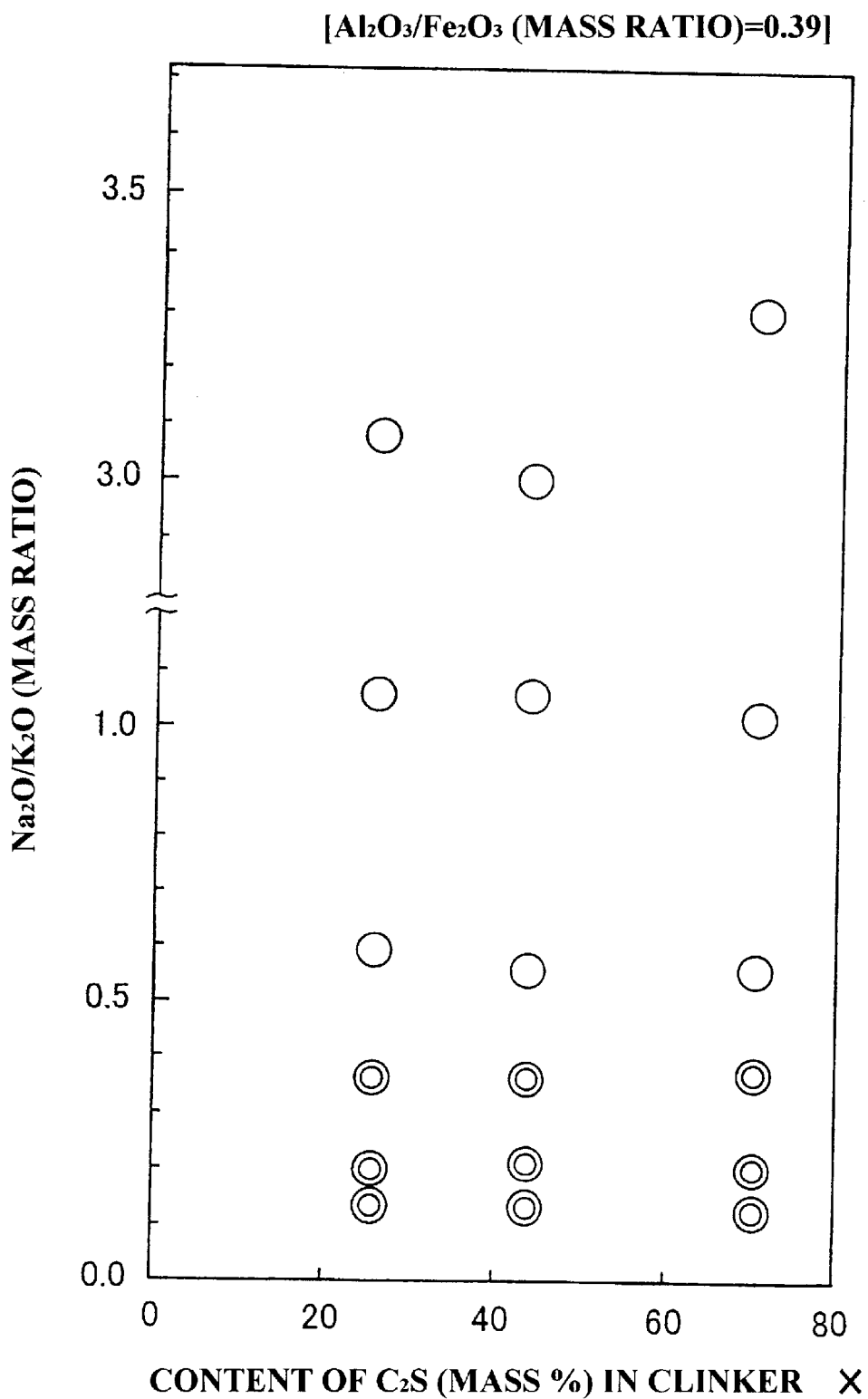
FIG. 8 is a graph showing the judged results by the coordinates of the content of C$_2$S and the component ratio of alkali components (Na$_2$O/K$_2$O) in the case that IM is 0.39.

What is claimed is:

1. A cement clinker comprising Al$_2$O$_3$ and Fe$_2$O$_3$ wherein the mass ratio of Al$_2$O$_3$/Fe$_2$O$_3$ is 0.05–0.62, and alkali components and C$_2$S, wherein the formula $0.0025X+0.1 \leq Y \leq 0.01X+0.8$ is satisfied, where:

Y=100×{mass of alkali components/mass of cement clinker}, and

X=100×{mass of C$_2$S/mass of cement clinker}.

2. A cement clinker comprising Al$_2$O$_3$ and Fe$_2$O$_3$ wherein the mass ratio of Al$_2$O$_3$/FeO$_3$ is 0.05–0.5, and alkali components and C$_2$S, wherein:

$0.0025X+0.25 \leq Y \leq 0.01X+0.8$ when $0.05 \leq Al_2O_3/Fe_2O_3 \leq 0.3$,   (1)

and $0.0025X+0.25 \leq Y \leq 0.01X+0.65$ when $0.3 \leq Al_2O_3/Fe_2O_3 \leq 0.5$ where:   (2)

Y=100×{mass of alkali components/mass of cement clinker}, and

X=100×{mass of C$_2$S/mass of cement clinker}.

3. The cement clinker according to claim 1, wherein the mass ratio of Na$_2$O to K$_2$O in said alkali components satisfies the formula: $0 \leq Na_2O/K_2O < 0.45$.

4. A cement composition comprising the cement clinker according to claim 1.

5. A method for manufacturing cement clinker comprising:

incorporating Al$_2$O$_3$ and Fe$_2$O$_3$ at the mass ratio of Al$_2$O$_3$ to Fe$_2$O$_3$ being 0.05–0.62, incorporating alkali components and C$_2$S wherein the formula $0.0025X+0.1 \leq Y \leq 0.01X+0.8$ is satisfied, where:

Y=100×{mass of alkali components/mass of cement clinker}, and

X=100×{mass of C$_2$S/mass of cement clinker}, and firing the resultant.

6. A method for manufacturing cement clinker according to claim 5, wherein the mass ratio of Na$_2$O to K$_2$O in the alkali components satisfies the formula: $0 \leq Na_2O/K_2O \leq 0.45$.

7. A method for treatment of waste containing alkali components comprising:

incorporating as a cement raw material waste containing alkali components at the mass ratio of $Al_2O_3/Fe_2O_3$ being 0.05 to 0.62, incorporating alkali components and $C_2S$, wherein the formula $0.0025X+0.1 \leq Y \leq 0.01X+0.8$ is satisfied, where:

$Y=100\times\{$mass of alkali components/mass of cement clinker$\}$, and $X=100\times\{$mass of $C_2S$/mass of cement clinker$\}$, mixing the cement raw material waste, alkali components and $C_2S$, and firing the resultant.

8. A method for treatment of waste containing alkali components according to claim 7, wherein the mass ratio of $Na_2O$ to $K_2O$ in the alkali components satisfies the formula: $0 \leq Na_2O/K_2O \leq 0.45$.

* * * * *

UNITED STATES PATENT AND TRADEMARK OFFICE
CERTIFICATE OF CORRECTION

PATENT NO. : 6,537,365 B2
DATED : March 25, 2003
INVENTOR(S) : Ikabata et al.

It is certified that error appears in the above-identified patent and that said Letters Patent is hereby corrected as shown below:

<u>Column 12,</u>
Line 36, should read as follows:
-- $0.0025X + -0.25 \leq Y \leq 0.01X + 0.65$ when $0.3 < Al_2O_3/Fe_2O_3 \leq 0.5$ --
Line 48, should read as follows:
-- satisfies the formula: $O \leq Na_2O/K_2O \leq 0.45$. --

Signed and Sealed this

Twenty-sixth Day of August, 2003

JAMES E. ROGAN
*Director of the United States Patent and Trademark Office*